United States Patent [19]
Riedhammer

[11] 3,908,377
[45] Sept. 30, 1975

[54] CONTROL SYSTEM FOR A HYDROSTATIC TRANSMISSION

[75] Inventor: Josef Riedhammer, Ulm (Danube), Germany

[73] Assignee: Hydromatik GmbH, Ulm (Danube), Germany

[22] Filed: Sept. 14, 1973

[21] Appl. No.: 397,443

[30] Foreign Application Priority Data
Sept. 27, 1972 Germany............................ 2247437

[52] U.S. Cl. ...................... 60/445; 60/464; 60/494; 91/442; 137/116.3; 417/217
[51] Int. Cl.²......................................... F16H 39/46
[58] Field of Search ............ 60/465, 488, 445, 447, 60/448, 464, 494; 417/212, 218, 221, 222, 217; 137/501, 497, 503, 116.3, 102; 91/442, 268

[56] References Cited
UNITED STATES PATENTS

| | | | |
|---|---|---|---|
| 2,630,681 | 3/1953 | Ferris.................................... | 60/447 |
| 2,661,756 | 12/1953 | Noon et al...................... | 137/497 X |
| 2,900,960 | 8/1959 | Gratzmuller.......................... | 91/442 |
| 2,961,829 | 11/1963 | Weisenbach.......................... | 60/448 |
| 3,588,285 | 6/1971 | Moon................................... | 417/202 |
| 3,679,327 | 7/1972 | Riedhammer et al. ............. | 417/222 |
| 3,753,627 | 8/1973 | Ward .................................. | 417/213 |

FOREIGN PATENTS OR APPLICATIONS
2,008,078 9/1971 Germany

*Primary Examiner*—Irwin C. Cohen
*Assistant Examiner*—Edward Look
*Attorney, Agent, or Firm*—Owen, Wickersham & Erickson

[57] ABSTRACT

A bleeder valve in a control system for a hydrostatic transmission includes a valve member which is displaceable in one direction by the pressure drop across a throttle orifice, against the resistance of a restoring spring, to connect a bleeder pipe to an auxiliary pump delivery. The valve member is displaceable in the opposite direction to connect the bleeder pipe to exhaust. The valve member has at least one additional working face to which the pressure in the bleeder pipe is applied to the same direction as the spring force.

3 Claims, 1 Drawing Figure

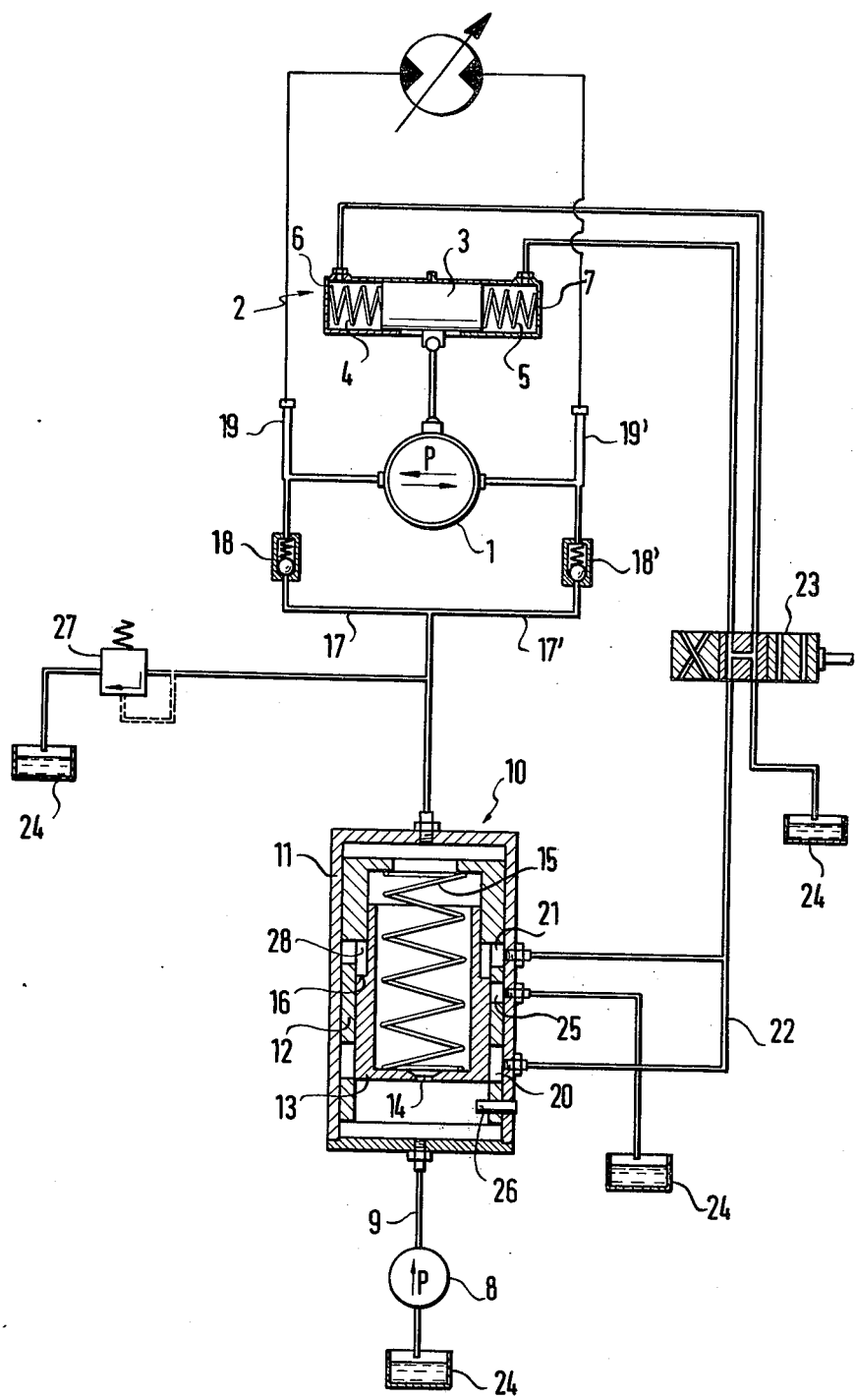

CONTROL SYSTEM FOR A HYDROSTATIC TRANSMISSION

BACKGROUND OF THE INVENTION

The invention relates to a control system for a hydrostatic transmission in which an auxiliary pump, driven in synchronism with the transmission, feeds hydraulic fluid through a throttle orifice and a feed pipe into the working circuit of the transmission to make good leakage loss, and part of the hydraulic fluid delivered by the auxiliary pump is tapped off by a bleeder valve and diverted through a bleeder pipe for controlling the capacity of the hydrostatic pump and/or motor of the hydrostatic transmission.

Control systems of this kind comprising a bleeder valve serve to bleed off part of the hydraulic fluid delivered by the auxiliary pump which is driven at a speed proportional to that of the driving engine, and to use the diverted fluid for controllably adjusting one or each of the two members of the hydrostatic transmission, i.e., of the hydrostatic pump and/or the hydrostatic motor.

Control means of the specified type have already been proposed (German Patent Specification No. 2008078) in which the bleeder valve uncovers a flow path for the hydraulic fluid to the actuator regulating the capacity of the pump of the hydrostatic transmission, as soon as the hydraulic fluid delivered by the auxiliary pump builds up a pressure head at the throttle orifice, which exceeds the counterthrust due to the spring loading of the valve member plus the effective supply pressure existing on the downstream side of the fixed throttle orifice. In this arrangement the bleeder valve functions purely as a volume dividing device. In order to derive from the diverted volume of fluid a pressure which can be used for regulating the hydrostatic pump a further fixed throttle is needed for building up the necessary controlling actuator pressure in the form of a static pressure head between this additional throttle and the bleeder outlet of the valve.

A disadvantage of this arrangement is that the auxiliary pump must be so designed that it is capable of supplying the volume of hydraulic fluid which flows continuously through the second throttle besides the volume of pressure fluid which must be introduced into the working circuit of the hydrostatic transmission. Furthermore, the pressure loss in this control system is relatively high. A final objection is that owing to the operation of the bleeder valve as a volume divider the volume of the hydraulic fluid fed into the working circuit of the hydrostatic transmission is proportional to the pressure head build-up by the auxiliary pump on the upstream side of the fixed throttle orifice, and to how wide the bleeder valve has opened, this proportionality being impossible to vary otherwise than by reconstructing the entire valve.

SUMMARY OF THE INVENTION

It is an object of the present invention so to improve the system that an auxiliary pump which is solely designed to supply the hydraulic fluid required for introduction into the working circuit of the transmission can also be used for simultaneously regulating the hydrostatic transmission and that the fluid introduced into the working circuit remains practically unaffected by the position of the bleeder valve.

Thus according to the present invention the bleeder valve includes a valve member which is displaceable in one direction by the pressure drop across the throttle orifice, against the resistance of a restoring spring, to connect the bleeder pipe to the auxiliary pump delivery, and in the opposite direction to connect the bleeder pipe to exhaust, the valve member having at least one additional working face to which the pressure in the bleed pipe is applied in the same direction as the spring force.

The feed pipe may be connected to exhaust through a pressure limiting valve. The result of this arrangement is that the pressure which builds up in the pipe leading to the regulator of the hydrostatic pump and/or of the hydrostatic motor will also act on this additional face and urge the valve member to reclose. The adjusted position of the regulator of the hydrostatic pump and/or motor is therefore locked by a trapped, stationary column of hydraulic fluid and it is not necessary for a continuous flow of fluid to maintain the required regulator pressure on the upstream side of an additional throttling device. When the pressure drop across the throttle orifice falls as a result of the speed of the auxiliary pump becoming less, then the pressure of the column of bled fluid acting on the additional valve face, plus the spring force, will preponderate and displace the valve member in the opposite direction until it connects the bleed pipe to exhaust, permitting the pressure of the fluid column to be relieved. Consequently the auxiliary pump may be of smaller capacity than the pump needed in the prior system, i.e. substantially the capacity of the auxiliary pump need not exceed that required for supplying the working circuit of the transmission with fluid. The loss of hydraulic fluid in the overall system is minimal because in practice there is no substantial loss to exhaust. Moreover, the unnecessary generation of heat by additional fixed throttling means is avoided.

The spring loading of the bleeder valve may be adjustable. Such adjustment can be accomplished in known ways, and it may be effected optionally or simultaneously by reference to parameters, such as the pressure in the working circuit, the prescribed speed of the engine and so forth. The response point of the bleeder valve can thus be shifted according to diverse requirements.

Conveniently the valve member is in the form of a piston and contains the throttle orifice. Moreover it may have a face adjacent the inlet which forms a control edge cooperating with a port to control communication from the inlet to the bleeder pipe.

The valve member may be in the form of a stepped piston and the shoulder formed by the step communicates with the bleeder pipe and provides the control edge cooperating with an exhaust port to control communication from the bleeder pipe to exhaust.

The differential piston may be provided with two or more such steps which define control chambers communicating with the exhaust, whereby additional control functions can be easily performed at the same time. This may be useful for instance for auxiliary drives or for overall regulation when the engine is arranged to drive the hydrostatic pumps of several hydrostatic transmissions.

With advantage the fixed throttle orifice in the valve member of the bleeder valve may be arranged to be independent of the viscosity of the hydraulic fluid.

The invention may be put into practice in various ways but one specific embodiment will now be described by way of example with reference to the accompanying drawing.

Other objects, advantages and features of my invention will become apparent from the following detailed description of one preferred embodiment taken with the accompanying drawing.

BRIEF DESCRIPTION OF THE DRAWING

The drawing is a diagram of a hydraulic control circuit constructed in accordance with one embodiment of the present invention.

DESCRIPTION OF ONE PREFERRED EMBODIMENT

A power unit, not shown in the drawing, usually an internal combustion engine, drives a hydrostatic pump 1 connected by pipe lines 19 and 19' to a hydrostatic motor together with which it forms a hydrostatic transmission. The hydrostatic pump is of variable capacity controllable by regulating means 2 comprising an actuator piston 3 which is displaceable in either direction between springs 4 and 5 acting in opposition and contained in cylinders 6 and 7. Besides the hydrostatic pump 1 the engine also drives an auxiliary pump 8 at a speed equal to or proportional to that of the engine. This pump is connected through its delivery pipe 9 to a bleeder valve 10.

This bleeder valve 10 comprises a valve body 11 with a fixed valve liner 12 containing a valve member in the form of a hollow piston 13 which has a throttle orifice 14 in its end face and which is urged (downwards as viewed in the drawing) by a spring 15. The space above the piston, i.e. on the downstream side of the throttle orifice 14, communicates permanently through pipes 17 and 17' (first outlet) and non return inlet valves 18 and 18' with whichever of the two pipes 19 or 19' of the hydraulic circuit of the hydrostatic transmission contains the lower pressure.

The hollow piston 13 is a stepped differential piston whereof the step forms an additional workiing face 16 bounding a control chamber 28. However, several such shoulders could be provided to form additional working faces for other purposes of control.

The liner 12 contains an exhaust port 25 between two annular ports 20 and 21, both communicating with a bleeder pipe 22. This bleeder pipe 22 can be selectably connected by a reversing valve 23 to one of the two control cylinders 6 or 7, whereas at the same time the other control cylinder 7 or 6 is connected to exhaust in the form of an oil reservoir 24.

The described arrangement functions as follows:

When the engine starts, it simultaneously starts up the hydrostatic pump 1 and the auxiliary pump 8 which, according to engine speed, pumps the necessary leakage oil for the hydrostatic pump in neutral position through the throttle orifice 14, one or other of the feed pipes 17 or 17' and the feeder valves 18 or 18', into one of the pipes 19 or 19' whichever contains the lower pressure, whereas surplus hydraulic fluid is exhausted through the pressure limiting valve 27.

As the speed of the engine rises a pressure head builds up across the throttle orifice and this eventually overcomes the force of the spring 15 and displaces the hollow piston in the upward direction, causing its lower edge to uncover the port 20 and admit the delivery pressure of the pump 8 to the bleeder pipe 22. Assuming that the reversing valve 23 is in its left hand position, pressure will enter the control cylinder 7 moving the piston 3, to adjust the hydrostatic pump 1, against the resistance of the spring 4, the hydraulic fluid displaced from the other control cylinder 6 returning through the reversing valve 23 into the oil reservoir 24. At the same time the hydraulic pressure also enters the port 21 and acts on the working face 16 of the hollow piston 13. A closing thrust which rises in proportion to the pressure in the bleeder pipe therefore results, and when the capacity of the hydraulic pump has been increased as required, i.e. when the bleeder pressure and the power of the control spring 4 are in equilibrium, this thrust will force the hollow piston 13 back into its former position.

The hydrostatic pump 1 is therefore now locked in the corresponding control position by a trapped column of fluid, no continuous flow of hydraulic fluid being needed to build up pressure on the upstream side of an additional throttle.

When the engine slows down pressure drop across the throttle orifice falls and is insufficient to balance the spring force aided by the pressure on the working face 16. The hollow piston 13 therefore moves downwards until communication is established between the port 21 and the exhaust port 25. The pressure of the fluid column in the bleeder pipe therefore falls and the hydrostatic pump 1 swings back until a fresh state of equilibrium is reached.

By increasing or reducing the surface area of the control face 16 the closing thrust which builds up at the hollow piston 13 can be chosen at will and hence the working characteristic of the system changed. It is also possible to provide two or more such control faces to operate as stages in tandem to carry out additional control functions, for instance for an auxiliary drive or compound control. The bias of the valve spring 15 may be adjustable either by hand or automatically by reference to operating parameters, such as system pressure, prescribed speed of the engine and so forth, for the purpose of shifting the response point of the bleeder valve to satisfy different requirements.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A fluid system comprising a pump, a fluid motor connected in a circuit with and driven by the output of said pump, means for varying the fluid capacity of said circuit, and an auxiliary pump wherein the auxiliary pump feeds hydraulic fluid through a throttle orifice and a feed pipe into the circuit to make good leakage loss, and part of the hydraulic fluid delivered by the auxiliary pump is tapped off by a bleeder valve and diverted through a bleeder pipe for controlling said means for varying the fluid capacity, the bleeder valve having a first port connected to the bleeder pipe and a second port connected to exhaust and a valve member for controlling the pressure in the bleeder pipe and which is displaceable in one direction by the pressure drop across the throttle orifice, against the resistance of a restoring spring, to open the first port and to connect the bleeder pipe to the auxiliary pump delivery, and in the opposite direction to open the second port and to connect the bleeder pipe to exhaust, the valve member having at least one additional working face to which the pressure in the bleeder pipe is applied in the same direction as the spring force and wherein the valve member is in the form of a piston and contains the throttle orifice.

2. A fluid system comprising a pump, a fluid motor connected in a circuit with and driven by the output of said pump, means for varying the fluid capacity of said circuit, and an auxiliary pump wherein the auxiliary pump feeds hydraulic fluid through a throttle orifice and a feed pipe into the circuit to make good leakage loss, and part of the hydraulic fluid delivered by the auxiliary pump is tapped off by a bleeder valve and diverted through a bleeder pipe for controlling said means for varying the fluid capacity, the bleeder valve having a first port connected to the bleeder pipe and a second port connected to exhaust and a valve member for controlling the pressure in the bleeder pipe and which is displaceable in one direction by the pressure drop across the throttle orifice, against the resistance of a restoring spring, to open the first port and to connect the bleeder pipe to the auxiliary pump delivery, and in the opposite direction to open the second port and to connect the bleeder pipe to exhaust, the valve member having at least one additional working face to which the pressure in the bleeder pipe is applied in the same direction as the spring force and wherein the valve member is in the form of a piston whereof a face of said piston adjacent the inlet forms a control edge cooperating with said first port to control communication from the inlet to the bleeder pipe.

3. A fluid system comprising a pump, a fluid motor connected in a circuit with and driven by the output of said pump, means for varying the fluid capacity of said circuit, and an auxiliary pump wherein the auxiliary pump feeds hydraulic fluid through a throttle orifice and a feed pipe into the circuit to make good leakage loss, and part of the hydraulic fluid delivered by the auxiliary pump is tapped off by a bleeder valve and diverted through a bleeder pipe for controlling said means for varying the fluid capacity, the bleeder valve having a first port connected to the bleeder pipe and a second port connected to exhaust and a valve member for controlling the pressure in the bleeder pipe and which is displaceable in one direction by the pressure drop across the throttle orifice, against the resistance of a restoring spring, to open the first port and to connect the bleeder pipe to the auxiliary pump delivery, the valve member having at least one additional working face to which the pressure in the bleeder pipe is applied in the same direction as the spring force and wherein the valve member is in the form of a stepped piston having a step and a shoulder formed by the step and the shoulder communicates with the bleeder pipe and provides a control edge cooperating with said second port to control communication from the bleeder pipe to exhaust.

* * * * *